United States Patent [19]

Kawabayashi

[11] 4,322,741
[45] Mar. 30, 1982

[54] IMAGE DIVIDING SYSTEM FOR USE IN TELEVISION

[76] Inventor: Jun Kawabayashi, Koshajutaki 125, Shimotsuchidana 23, Pujisawa, Kanagawa, Japan

[21] Appl. No.: 181,366

[22] Filed: Aug. 26, 1980

[51] Int. Cl.³ .............................................. H04N 9/12
[52] U.S. Cl. ...................................... 358/56; 358/64; 358/87
[58] Field of Search ...................... 358/56, 64, 87, 104

[56] References Cited

U.S. PATENT DOCUMENTS 3,051,779 8/1962 Lakjer .................................... 358/87
3,492,419 1/1970 Bartonik ................................ 358/87
3,699,244 10/1972 Cohen et al. .......................... 358/87
3,909,525 9/1975 Fagan ..................................... 358/87

*Primary Examiner*—Richard Murray
*Attorney, Agent, or Firm*—Cantor and Singer

[57] ABSTRACT

An image dividing system for use in television wherein the optical image of a subject is divided into parts and picked up by means of a plurality of exclusive image pickup tubes assigned thereto respectively, and a continuous video image of the subject is produced by a picture tube which is equipped with a plurality of electron guns correspondingly to the image pickup tubes and has an integral viewing screen.

3 Claims, 1 Drawing Figure

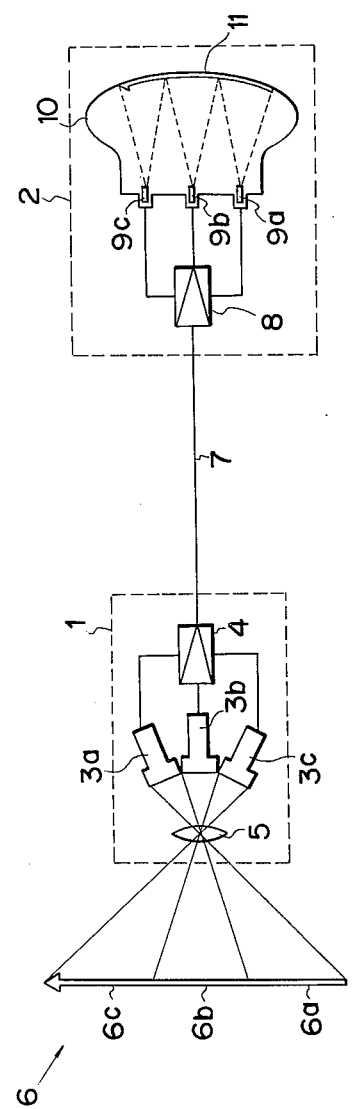

IMAGE DIVIDING SYSTEM FOR USE IN TELEVISION

BACKGROUND OF THE INVENTION

The present invention relates to television, and more particularly to an image dividing system thereof which transmits and receives an image by dividing the same into a plurality of substantially plane parts.

With the recent spread of television receivers having large-sized viewing screen, there have been arising problems of increase in the power consumption and deterioration in the quality of picture. A larger picture tube naturally increases the power required for obtaining a distinct picture, and it further tends to bring about another disadvantage of blur on the viewing screen, especially at the two sides thereof.

BRIEF SUMMARY OF THE INVENTION

The present invention has been accomplished in an attempt to eliminate the disadvantages in the prior art described above, and its features reside in that the entire optical image of a desired subject is divided into parts and picked up by means of a plurality of exclusive image tubes assigned to the divided parts respectively, and the video signals thus obtained are processed in a picture tube which is equipped with electron guns corresponding to the image pickup tubes and which has an integral viewing screen, so that a continuous video image of the subject is produced on the screen.

OBJECT OF THE INVENTION

It is an object of the present invention to reduce the power consumption in a television receiver with a large-sized viewing screen.

Another object of the invention is to improve the picture quality in such a television receiver.

An a further object of the invention resides in decreasing the depth of such a television receiver to a relatively small dimension.

BRIEF DESCRIPTION OF THE DRAWING

The accompanying sole FIGURE is a block diagram illustrating the principle of the present invention.

DETAILED DESCRIPTION OF THE INVENTION

The accompanying figure is a block diagram illustrating the principle of an image dividing system according to the present invention, wherein any components not related to the following explanation are omitted.

In the diagram, 1 denotes an image transmitter block, and 2 denotes an image receiver block. The transmitter block 1 comprises image pickup tubes 3a, 3b, 3c and an amplifier 4. The pickup tubes serve to convert into video signals the optical image of a subject 6 having passed through a lens 5. In color television, each of the pickup tubes employed is an assembly consisting of three pickup tubes combined with red, blue and green filters respectively. And the tubes 3a, 3b and 3c are assigned individually to predetermined ranges to be picked up. For instance, in an exemplary case where the subject 6 is divided into three parts of 6a, 6b and 6c as illustrated, the pickup tube 3a is assigned to the part 6a, the tube 3b to the part 6b, and the tube 3c to the part 6c, respectively. That is, the entirety of a desired subject to be picked up is divided into a plurality of parts, which are covered by image pickup tubes assigned thereto exclusively. In this manner, each of the pickup tubes 3a, 3b and 3c can be directed for operation at the most effective angle as shown, hence achieving an excellent distinction far greater than the one obtainable by the prior art.

The video signals converted by the pickup tubes 3a, 3b and 3c are amplified by an amplifier 4 and then are sent via a transmission line 7 to the receiver block 2. The circuit configuration of the amplifier 4 and its peripheral means and also the transmission mode may be the known ones, and either wire or wireless system may be adopted for the transmission line 7.

The signals having reached the receiver block 2 are amplified by an amplifier 8 and then are fed to electron guns 9a, 9b and 9c provided correspondingly to the pickup tubes 3a, 3b and 3c. The electron guns are contained in picture tube 10 fixed at optimal positions in the manner that the joints of a picture 11 overlap each other exactly. Therefore, the image of the entire subject is rendered as a complete picture on an integral viewing screen without any joint. It is natural that, in the case of color television, each of the electron guns 9a, 9b and 9c employed is an assembly consisting of red, blue and green guns grouped integrally. In the picture tube 10 so constituted as described above, merely a small amount of energy is sufficient for operating the electron guns to cause a reduction of the power consumption in the receiver as a result. Moreover, each electron gun can be formed in small dimensions to decrease the depth of the receiver. And it becomes further possible to attain a remarkably distinct picture due to the advantage of achieving a great beam density.

Thus, outstanding effects are offered by the image dividing system of the present invention as described hereinabove.

It is to be understood that, in view of the objects and the effects of this invention, any modification of the structure defined in the claim is covered within the scope of the invention.

What is claimed:

1. An image dividing system for use in telecasting which converts the optical image of a subject into video signals by means of a pickup tube and processes said signals in a picture tube to obtain a video image of said subject, said system comprising a transmitter block which comprises a lens system forming a single optical image and a plurality of pickup tubes disposed adjacently, said optical image being focused on said tubes such that said image spans said tubes whereby each said tube picks up a portion of said image, and an image receiver block which comprises a picture tube having a plurality of electron guns corresponding to said pickup tubes, wherein beams emitted from said electron guns produce a continuous video image of said subject on a viewing screen.

2. The image dividing system as defined in claim 1, wherein each of said pickup tubes is an assembly consisting of three tubes for red, blue and green, and each of said electron guns is an assembly consisting of three guns for red, blue and green.

3. The image dividing system as defined in claim 1 or 2, wherein the video signals of said pickup tubes are transmitted individually in a wireless mode.

* * * * *